(12) United States Patent
Li et al.

(10) Patent No.: US 8,158,917 B2
(45) Date of Patent: Apr. 17, 2012

(54) OPTICAL WAVEFRONT SENSOR AND OPTICAL WAVEFRONT SENSING METHOD

(75) Inventors: Xiang Li, Singapore (SG); Liping Zhao, Singapore (SG); Zhong Ping Fang, Singapore (SG); Krishna Asundi Anand, Singapore (SG); Lin Seng Ong, Glendale Park (SG); Herawan Rinov, Singapore (SG)

(73) Assignee: Agency for Science Technology and Research, Centros (SG)

( * ) Notice: Subject to any disclaimer, the term of this patent is extended or adjusted under 35 U.S.C. 154(b) by 732 days.

(21) Appl. No.: 12/097,434

(22) PCT Filed: Dec. 13, 2005

(86) PCT No.: PCT/SG2005/000417
§ 371 (c)(1),
(2), (4) Date: Sep. 26, 2008

(87) PCT Pub. No.: WO2007/070006
PCT Pub. Date: Jun. 21, 2007

(65) Prior Publication Data
US 2009/0152453 A1   Jun. 18, 2009

(51) Int. Cl.
*G01J 1/20* (2006.01)
(52) U.S. Cl. .......... 250/201.9; 250/201.2; 356/512; 356/521
(58) Field of Classification Search .......... 250/208.1, 250/201.2, 201.4, 201.9; 356/512, 521
See application file for complete search history.

(56) References Cited

U.S. PATENT DOCUMENTS

| | | | |
|---|---|---|---|
| 5,864,381 A | 1/1999 | Neal et al. | |
| 5,912,731 A | 6/1999 | DeLong et al. | |
| 6,184,974 B1 | 2/2001 | Neal et al. | |
| 6,376,819 B1 | 4/2002 | Neal et al. | |
| 6,430,328 B1 | 8/2002 | Culver et al. | |
| 6,547,395 B1 | 4/2003 | Neal et al. | |
| 6,550,917 B1 | 4/2003 | Neal et al. | |
| 6,666,857 B2 | 12/2003 | Smith | |
| 6,707,020 B1 | 3/2004 | Praus, II et al. | |
| 6,747,781 B2 * | 6/2004 | Trisnadi | 359/279 |

(Continued)

FOREIGN PATENT DOCUMENTS
WO   WO 01/04590 A1   1/2001
(Continued)

OTHER PUBLICATIONS

Segolene Olivier et al., "Liquid-crystal Hartmann wave-front scanner", Applied Optics, vol. 39, No. 22, Aug. 1, 2000, pp. 3838-3846.

(Continued)

*Primary Examiner* — Francis M Legasse, Jr.
(74) *Attorney, Agent, or Firm* — Stephen A. Bent; Foley & Lardner LLP

(57) ABSTRACT

An optical wavefront sensor comprising a light manipulation device; a detector for detecting light signals having been subjected to the light manipulation device; and a controller coupled to the manipulation device, the controller controlling the manipulation device to function as a lenslet array, each lenslet of the array focussing an incident portion of a wavefront onto the detector. The controller may also control the distance between the detector and the manipulation device. The spatial resolution of Shack-Hartmann sensors can be increased by digital scanning the wavefront with the manipulation device. The wavefront sensing can be dynamic adaptive by setting of parameters of the manipulation device.

20 Claims, 14 Drawing Sheets

U.S. PATENT DOCUMENTS

| | | |
|---|---|---|
| 6,750,957 B1 | 6/2004 | Levecq et al. |
| 6,784,408 B1 | 8/2004 | Cheung et al. |
| 6,819,413 B2 | 11/2004 | Neal et al. |
| 2001/0033433 A1* | 10/2001 | Shinoda .................. 359/798 |
| 2005/0174535 A1* | 8/2005 | Lai et al. .................. 351/205 |

FOREIGN PATENT DOCUMENTS

| | | |
|---|---|---|
| WO | WO 03/051189 A2 | 6/2003 |
| WO | WO 03/051189 A3 | 6/2003 |
| WO | WO 03/054613 A2 | 7/2003 |
| WO | WO 2004/042433 A2 | 5/2004 |

OTHER PUBLICATIONS

Vincent Laude et al., "Hartmann wave-front scanner", Optics Letters, vol. 24, No. 24, Dec. 15, 1999, pp. 1796-1798.

Norbert Lindlein et al., "Algorithm for expanding the dynamic range of a Shack-Hartmann sensor by using a spatial light modulator array", Opt. Eng. 40(5) 837-840, May 2001.

L. Seifert et al., "The adaptive Shack-Hartmann sensor", Optics Communications 216 (2003) 313-319.

Jungtae Rha et al., "Reconfigurable Shack-Hartmann wavefront sensor", Opt. Eng. 43(1) 251-256, Jan. 2004.

\* cited by examiner (a) Slope in original position (b) one step of scanning in y direction (c) one step of scanning in x direction (d) slope matrix after fully scan

OPTICAL WAVEFRONT SENSOR AND OPTICAL WAVEFRONT SENSING METHOD

FIELD OF INVENTION

The present invention relates broadly to an optical wavefront sensor and to a method of optical wavefront sensing. In particular, the present invention relates to a modified Shack-Hartmann wavefront sensor.

BACKGROUND

The wavefront of an optical wave is the locus of points that have the same phases, i.e. points that have the same optical path length from a light source from which the optical wave originates. Wavefront sensors are employed to measure and analyse the wavefront of an optical wave. Measuring and analysing the wavefront of an optical wave is applied in a number of different technologies, including measurement of the flatness or warpage of wafers or chucks in semiconductor technology, or measurement of the flatness of work pieces in precision engineering, such as for LCD panels, hard disks etc. Other areas of application include measurement of the aberration of optics and beam quality of lasers in optics manufacture, measurement and analysis of aberrations of eyes in ophthalmic diagnosis, and measurement and analysis of the turbulence of the atmosphere to improve the quality of observations in astronomy and adaptive optics technology fields.

The technologies in wavefront sensors include Hartmann wavefront sensors (HWS), and Shack-Hartmann wavefront sensors (SHWS). In the original HWS technology, a micro-holes array 100 is positioned in front of an optical lens 102, as shown in FIG. 1. The micro-holes array 100 is used to measure the slopes of a wavefront 104 in sub-apertures. The wavefront is reconstructed based on the matrix of slopes measured at detection plane 106. The reconstruction algorithms are generally categorized into zonal and modal estimations.

In SHWS, which constituted a break-through of wavefront sensor technology, a lenslet array 200 is employed, as shown in FIG. 2. The lenslet array 200 replaces the micro-holes array 100 (FIG. 1) and lens 102 (FIG. 1), by providing an array of physical sub-apertures, i.e. lenslets in the one optical component. The wavefront reconstruction algorithms employed are the same as for HWS. Most current commercial wavefront sensors are SHWS.

In order to improve the dynamic range of SHWS, it has been suggested to employ a spatial light modulator (SLM) as a physical shutter array aligned with the lenslet array 200. The SLM is placed in front of the physical lenslet array 200 and used to switch on and off the sub-apertures of the lenslet array 200, which remains the focusing element of the SHWS.

It has also been suggested to employ an SLM in HWS, to develop a scanning HWS. The SLM is used to generate a micro-holes array that is moved in a lateral direction relative to the lens 102 (FIG. 1) to improve the sensitivity, dynamic range and accuracy of the HWS. The focusing element remains the physical lens 102 (FIG. 1) in scanning HWS.

A physical scanning technique has also been proposed for SHWS, in which the physical lenslet array 200 and detection plane (FIG. 2) are shifted in both x and y directions. This physical scanning technique can be used to improve the measurement range in the lateral direction, where the measurement results of every sub-area are stitched to form a larger area.

The main drawbacks of conventional HWS include that the contrast of the light beam projected on the photoelectric detectors is poor, resulting in poor accuracy of centroid finding and wavefront reconstruction. The vignetting effect induces a larger spot size and consequently a relatively small measurement range. On the other hand, the drawbacks of conventional SHWS include the use of a physical lenslet array. The features and parameters of conventional SHWS are thus fixed and restricted by the physical lenslet array. Since the lateral resolution is depend on the size of lenslet, generally, another drawback of conventional SHWS is the poor lateral resolution.

Even with the proposed modifications to both HWS and SHWS as described above, there are significant drawbacks. More particular, the proposed modifications to HWS still exhibit the drawbacks of HWS mentioned above. In relation to modifications of SHWS, the main drawback remains that those modifications have been unable to achieve an improved lateral resolution without introduction of potentially serious measurement errors as a result of physical movement of entire components of the SHWS.

A need therefore exists to provide a wavefront sensor that addresses at least one of the above mentioned drawbacks.

SUMMARY

In accordance with a first aspect of the present invention there is provided an optical wavefront sensor comprising a light manipulation device; a detector for detecting light signals having been subjected to the light manipulation device; and a controller coupled to the manipulation device, the controller controlling the manipulation device to function as a lenslet array, each lenslet of the array focussing an incident portion of a wavefront onto the detector.

The detector may be moveable with respect to the manipulation device for adaptive wavefront measurements.

The controller may control the manipulation device such that the lenslet array is moved relative to the wavefront for lateral scanning of the wavefront while the manipulation device remains at a constant lateral position.

The lenslet array may be moved in steps of single or multiple lateral pixel units of the manipulation device.

The lenslet array may be varied while being moved such that the scanning is at a sub-lateral pixel unit level of the manipulation device.

The controller may control the manipulation device such that the lenslet array is rotated in a lateral plane of the light manipulation device.

The controller may control the manipulation device such that the entire incident wavefront or only a part thereof are scanned.

The controller may further control the manipulation device to function as a switch to control an on or off state of lenslet array, for expanding a dynamic range of the sensor.

The controller may control the manipulation device to function as a Cartesian coordinate lenslet array.

The controller may control the manipulation device to function as a polar coordinate lenslet array.

The detector may comprise a CCD detector, or a CMOS detector, or a PSD (position sensing device).

The sensor may further comprise a processor coupled to the detector for reconstructing the wavefront from light signals detected by the detector.

The processor may reconstruct the wavefront from a slope matrix detected by the detector.

The sensor may further comprise a moving stage coupled to the controller for moving the detector relative to the manipulation device.

The controller may control settings of the manipulation device and the moving stage for the adaptive measurements.

The controller may further be coupled to the detector, and automatically controls the settings of the manipulation device and the moving stage for the adaptive measurements based on measurement signals detected at the detector.

The manipulation device may comprise a spatial light modulator.

The manipulation device may comprise a micro-mirror array.

The lenslets of the array may comprise circular, elliptic, rectangular, triangular, hexagonal, or octagonal apertures.

In accordance with a second aspect of the present invention there is provided a method of optical wavefront sensing comprising controlling a light manipulation device to function as a lenslet array, each lenslet of the array focussing an incident portion of a wavefront onto a detector.

The method may further comprise controlling settings of the manipulation device and a distance between the detector and the manipulation device for adaptive wavefront measurements.

The method may comprise automatically controlling the settings and the distance for the adaptive measurements based on measurement signals detected at the detector.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 7 shows the focus point array of the lenslet array of FIG. 6a.

DETAILED DESCRIPTION

The example embodiments described provide a modified SHWS having an improved lateral resolution compared with conventional SHWS's, and for measuring the details of specific areas of interest of a wavefront.

Figure 1:
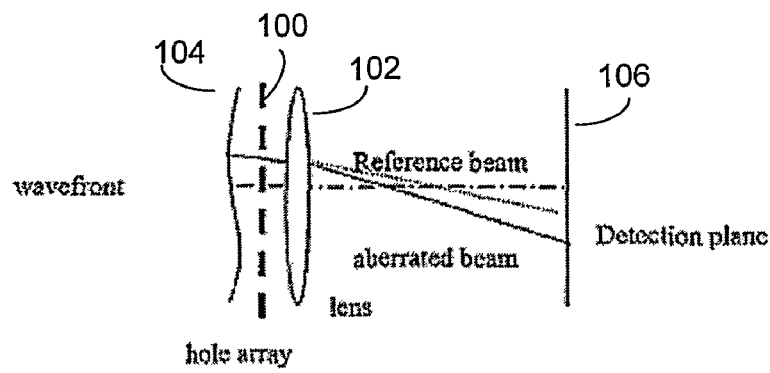
FIG. 1 is a schematic drawing of a HWS.
Figure 2:
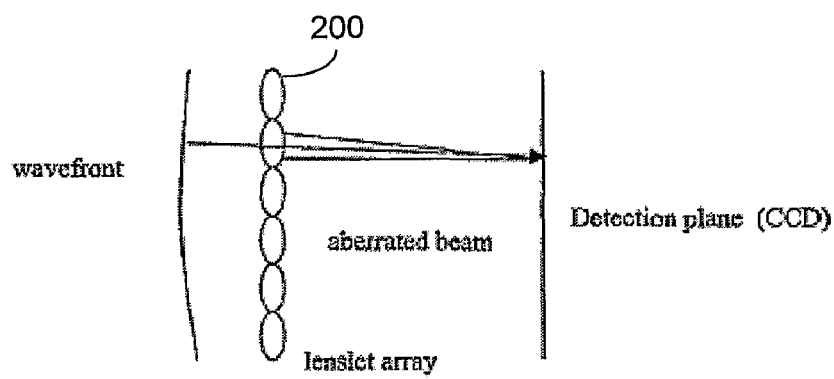
FIG. 2 is a schematic drawing of a SHWS.
Figure 3:
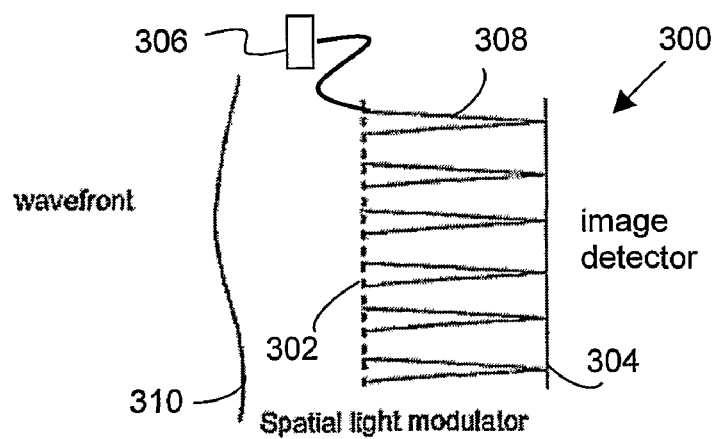
FIG. 3 is a schematic drawing of a modified SHWS in accordance with an example embodiment.

FIG. 3 is a schematic drawing of a modified SHWS 300 according to an example embodiment. The SHWS 300 comprises a light manipulation device in the form of a SLM 302 positioned in front of a image detector 304. The image detector may e.g. be in the form of a CCD detector, or a CMOS detector, or a PSD (position sensing device). The phase and transmittance of each pixel in the SLM 302 can be set by programming executed on a controller 306 coupled to the SLM 302. A lenslet array can thus be formed by programming of the pixels based on diffractive optics element (or binary optics element) techniques. A plurality of individual focusing beam 308 from the lenslet are shown in FIG. 3, with each lenslet focusing a portion of the incident wavefront 310 onto the image sensing plane 304.

Significantly, in the SHWS 300, the lenslet array can scan a measurement area without physical movement of the optical components, in particular the SLM 302. This advantageously provides a high lateral resolution compared to conventional SHWS's.

The SLM 302 consists of an array of optical elements or pixels, in which each pixel can act independently to modulate the amplitude or phase of incident light. The SLM 302 can modulate the incident light in the mode of amplitude-only, phase-only, or in the combination phase-amplitude. Each lenslet is a sub-aperture of the SHWS 300, with each lenslet dissecting the incident wavefront 310 and focusing a beam through each sub-aperture onto the detector, in the example embodiment the CCD plane 304.

Figure 4:
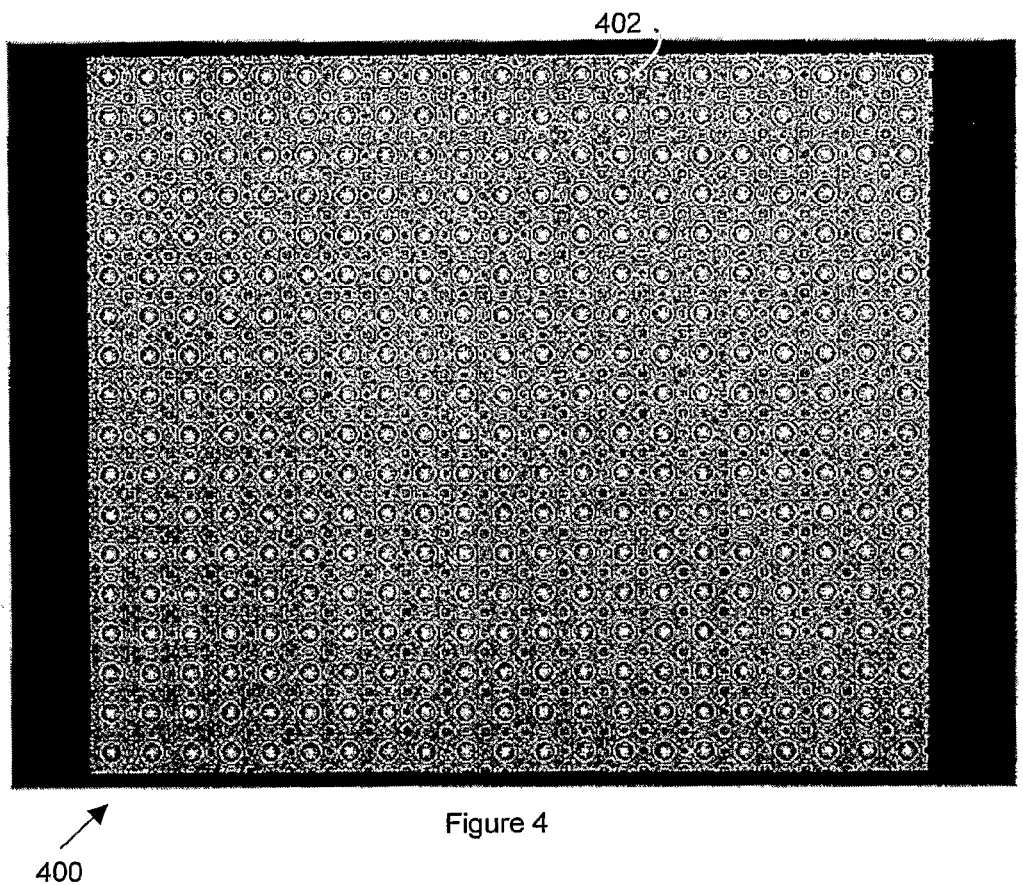
FIG. 4 shows a lenslet array set in an SLM, according to an example embodiment.

FIG. 4 shows a lenslet array 400 set in the SLM 302 (FIG. 3). The parameters of the lenslet array 400, such as focal length, size, pitch etc can be set by programming executed by the controller 306 (FIG. 3). The lenslet or sub-apertures 402 may be circular, elliptic rectangular, hexagonal, triangular, octagonal, or other configuration depending on the optical requirements. In the example embodiment, the lenslet array 400 is set in the SLM 302 (FIG. 3) by programming pixel units of the SLM 302 (FIG. 3) to either transparent, step of grey levels, or opaque. One example of a suitable SLM is a liquid crystal modulator array.

Figure 5:
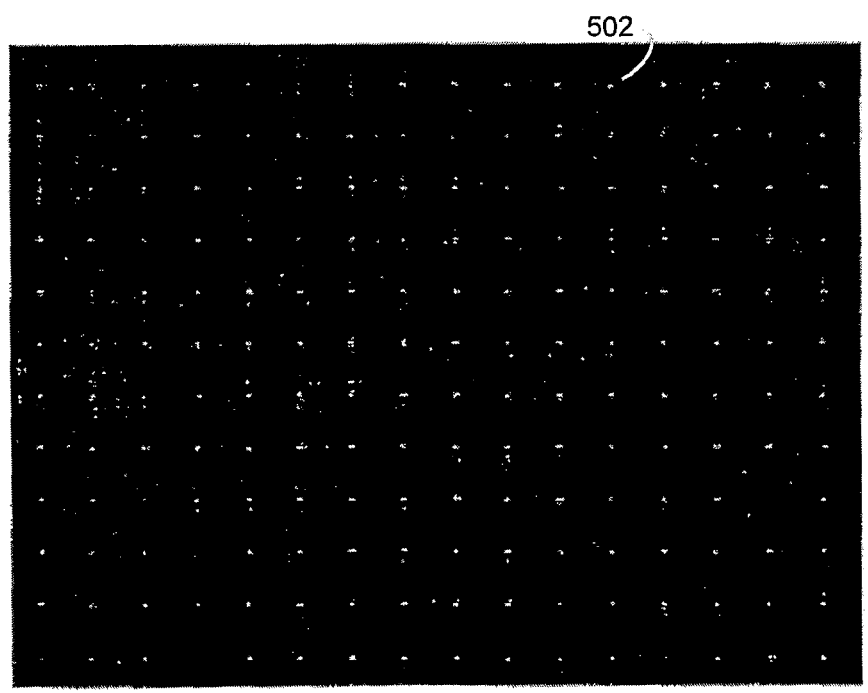
FIG. 5 shows the focus point array of the lenslet array of FIG. 4.

FIG. 5 shows the focus point array 500 detected at the CCD plane 304 (FIG. 3) through the lenslet array 400 (FIG. 4). Each focus point 502 corresponds to one of the sub-apertures 402 (FIG. 4) of the lenslet array 400 (FIG. 4). Centroids can be calculated based on the image detected at the CCD plane 304 (FIG. 3), and a wavefront corresponding to the incident wavefront 310 (FIG. 3) can be reconstructed using known reconstruction algorithms. As mentioned in the background section, reconstruction algorithms can be categorised into zonal and modal estimations. Examples of zonal estimation include the Southwell, Hudgin and Fried algorithms [Wavefront estimation from wave-front slope measurements, J.Opt-.Soc.Am. Vol. 70, No. 8, August 1980, pp 998-1006]. Examples of modal estimation include Zernike and Legndre polynomials [History and principle of Shack-Hartmann Wavefront Sensing, Journal of refractive surgery, Volume 17, September/October 2001], [Modal wave-front estimation from phase derivative measurements, J.Opt. Soc.Am., Vol. 69, No. 7 Jul. 1979, pp 972-977]

Figure 6A:
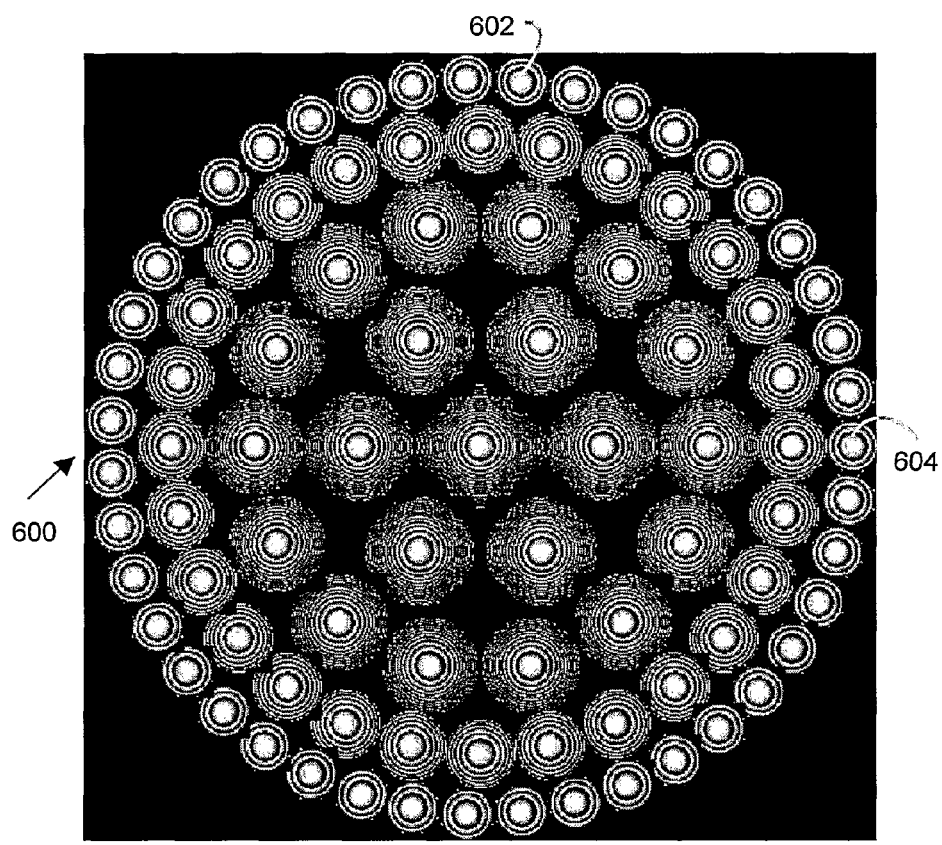
FIGS. 6a-c shows three examples of lenslet arrays set in SLM, according to an example embodiment.
Figure 6B:
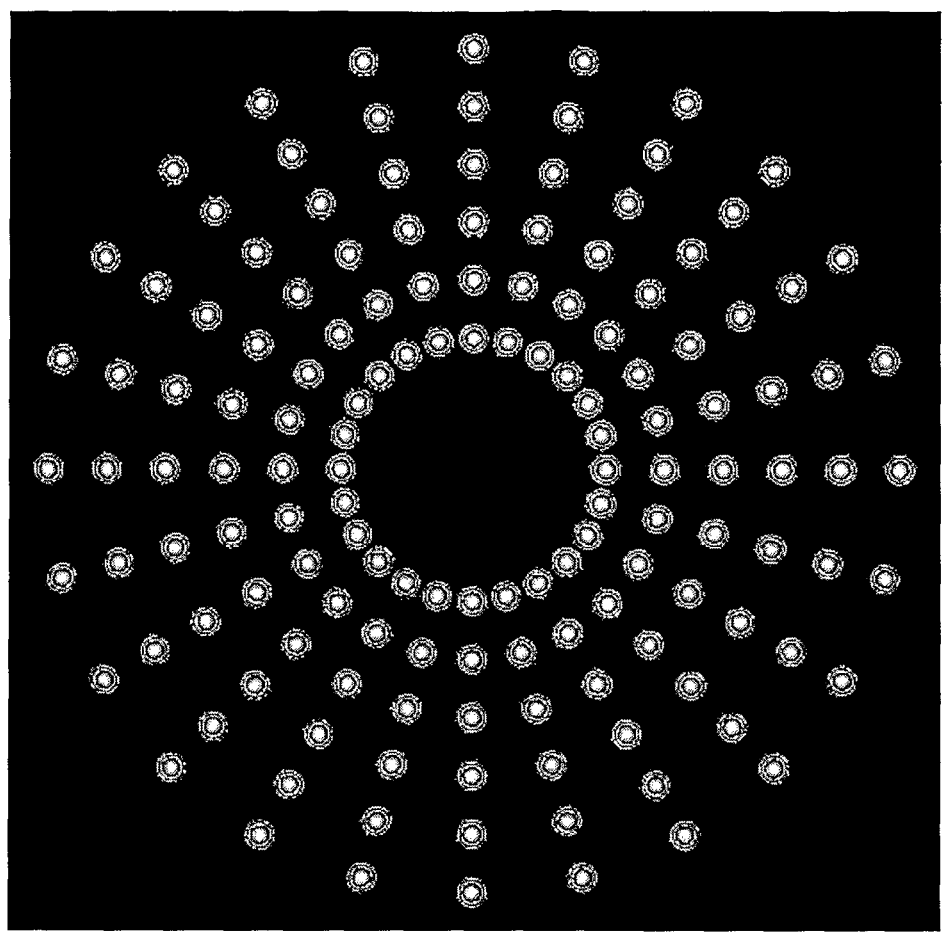
Figure 6C:
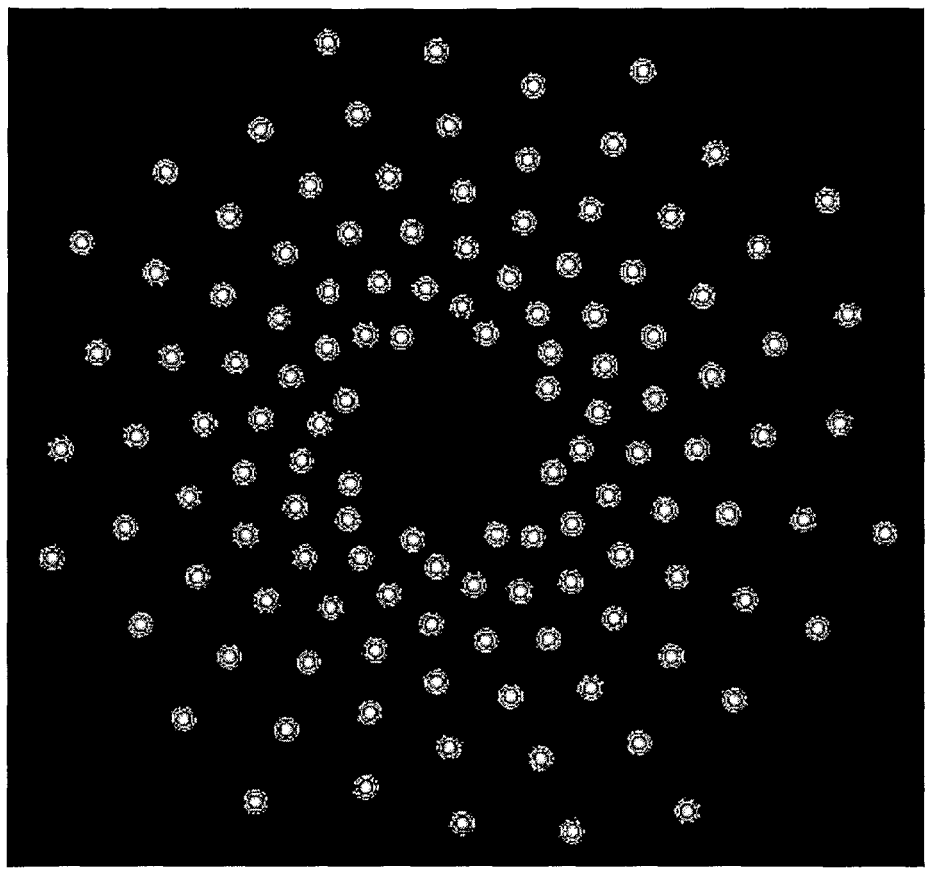
Figure 7:
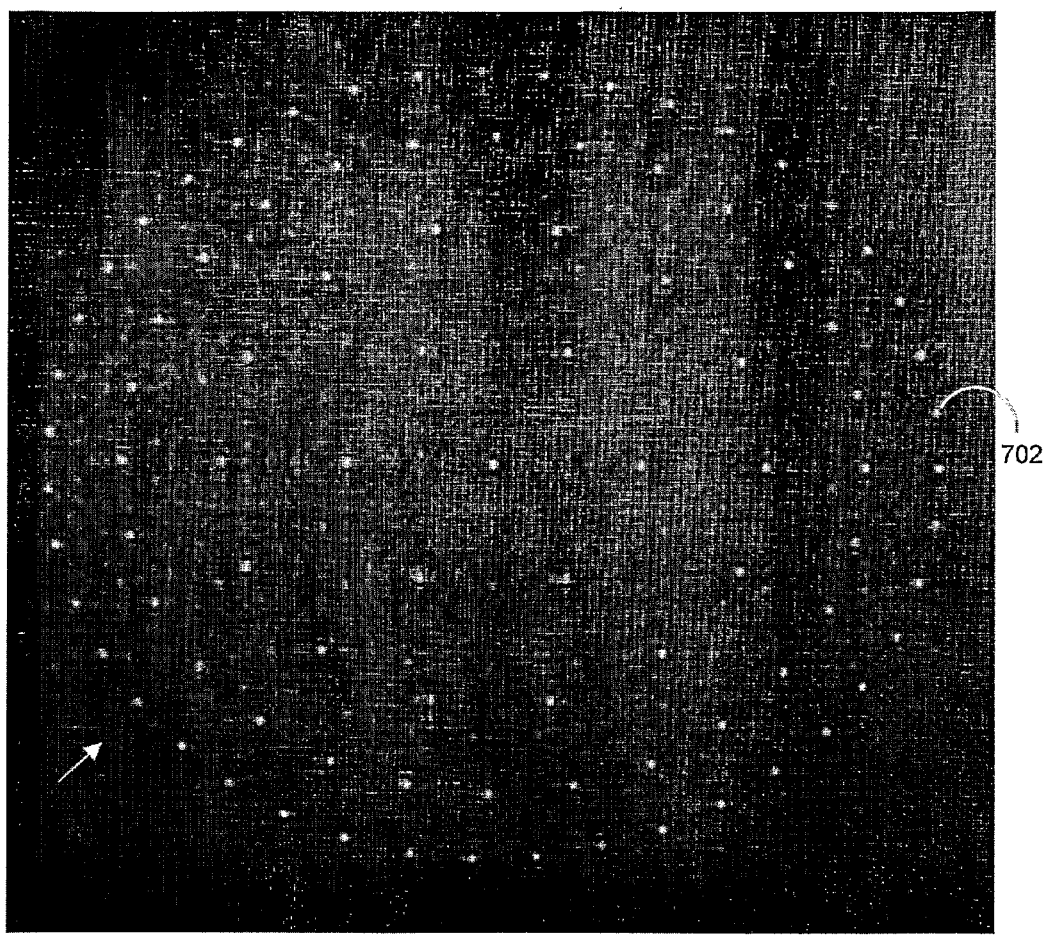
Figure 8:
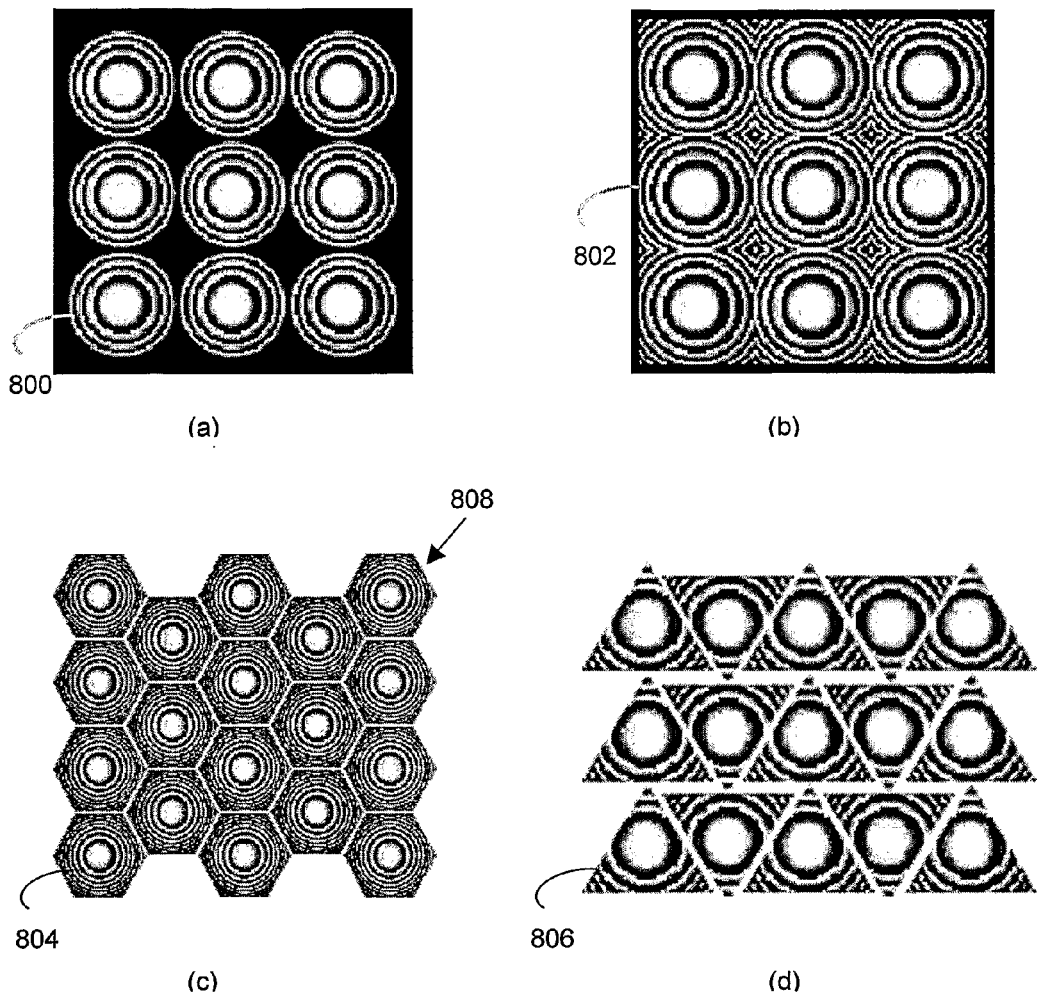
FIGS. 8a to d show different lenslets set in an SLM, according to example embodiments.

In the example embodiment, the layout of the lenslet array can be changed for the measurement of various wavefronts. For a uniform wavefront, the layout as shown in FIGS. 4 and 5 may be used. For other wavefronts, for example the wavefront of a laser beam, the energy distribution and geometric profile may be centre symmetric. For such a wavefront, the layout in polar coordinates as shown in FIGS. 6a-c and 7 may be set in the SLM 302 (FIG. 3). In FIG. 6*a*, the lenslet array 600 is in polar coordinates, i.e. with concentric rings 602 of individual lenslets 604. In FIG. 6*b*, the lenslet array is in radial pattern; in FIG. 6*c*, the lenslet array is in helical pattern. These two patterns can be used to replace two classical Hartmann screen patterns respectively described in [Hartmann and other screen tests, chapter 10 of Optical Shop Testing, pp 374-379]. FIG. 7 shows the corresponding focus point array 700, with each focus point 702 corresponding to one of the lenslets 604 (FIG. 6*a*).

FIGS. 8*a* to *d* example lenslet shapes 800, 802, 804, and 806 respectively in different example embodiments. Since the lenslet array is generated by programming of SLM pixels, a large variety of shapes can be implemented. As will be appreciated by a person skilled in the art, a significant area of the lenslet array is not utilised in the circular format, compare e.g. the dark areas between the circular lenslets 800 in FIG. 8*a*, so that the incoming wavefront is not fully sampled. Example embodiments of the present invention can provide none-circular format lenslets (compare FIGS. 8*b* to *d*) including an array of hexagonal lenslets 804 (FIG. 8*c*), in which the lenslets 804 can be aligned adjacent to each other with substantially the entire area of the lenslet array 808 being utilised. The parameters and layout of the lenslet arrays in different embodiments can thus be adjusted according to different application requirements. The different pattern may be used to settle various concerns, for example, diffraction efficiency, noisy spot, different light source etc. The different layout can be used for different reconstruction algorithm, for example the square format is suitable for zonal reconstruction, and hexagonal format is suitable for modal reconstruction etc.

Furthermore, since the lenslet array is generated utilising a SLM, the example embodiment provides a high flexibility, i.e. the position of every lenslet can be shifted in lateral direction without any physical movement of the SLM itself. Therefore, lateral scanning of the lenslet array is realised through programming of the SLM pixel, and is thus a digital scanning technique. Example digital scanning techniques that can be employed with the example embodiment will now be described.

Figure 9:
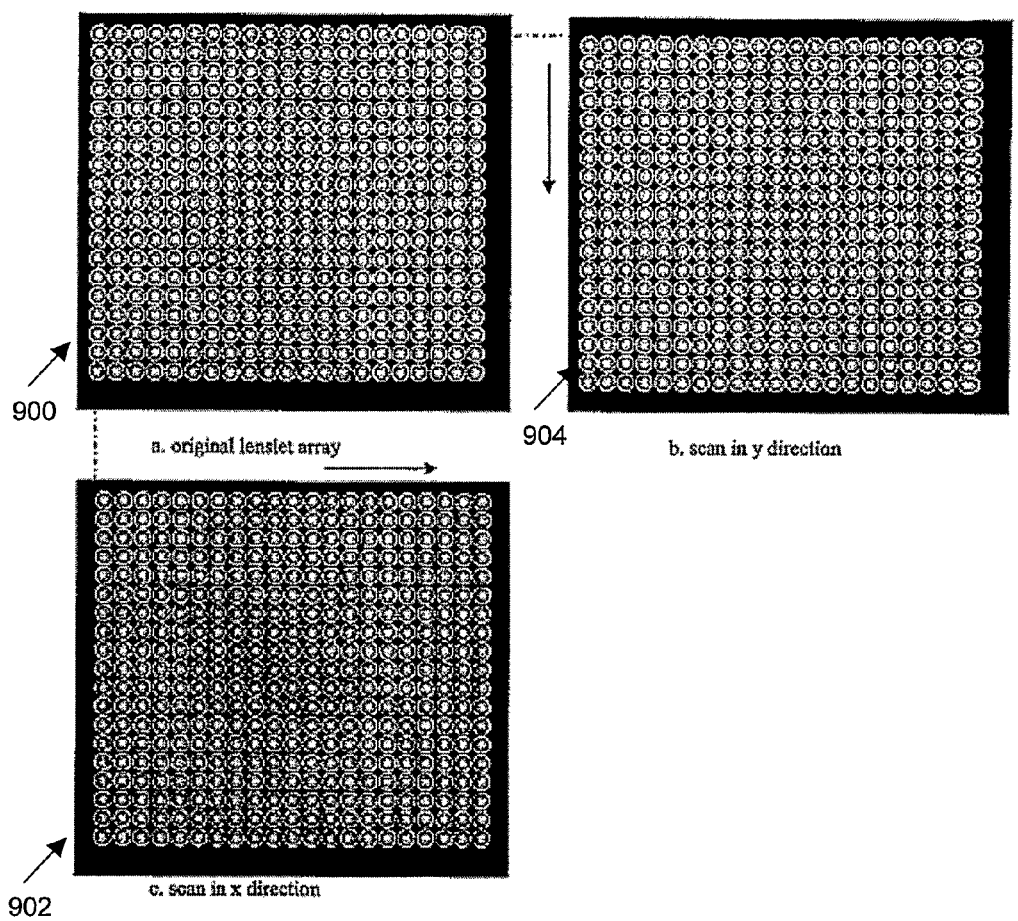
FIGS. 9a to c are schematic drawings illustrating lateral scanning in the SHWS of FIG. 3.
Figures 10A, 10B:
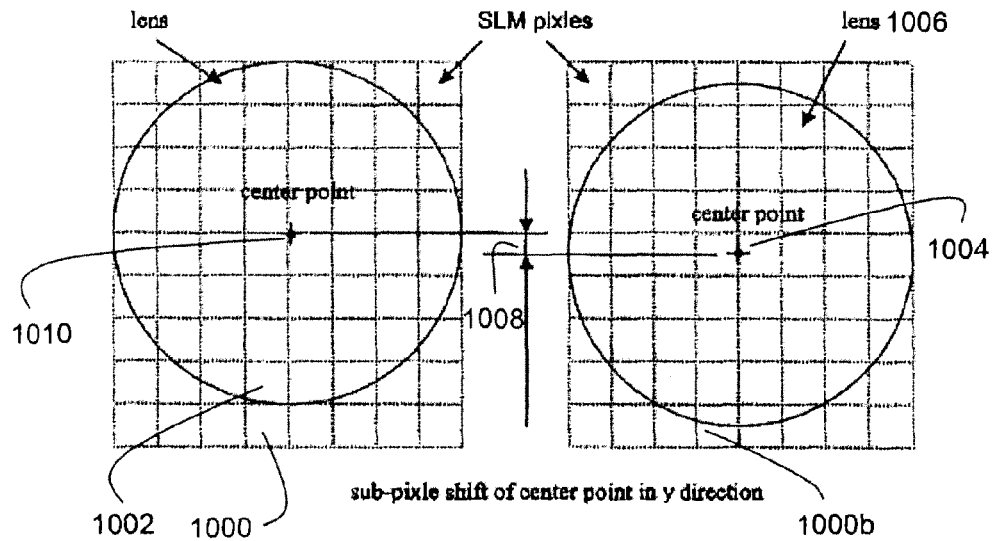
FIGS. 10a and b are schematic drawings illustrating sub-pixel scale scanning in an SHWS according to an example embodiment.

FIGS. 9*a* to *c* illustrate lateral scanning in the x direction (FIG. 9*c*), and in the y direction (FIG. 9*b*), from an original lenslet array (FIG. 9*a*). The lenslet array can be controlled to execute a combined x and y directions lateral scanning. The step of scanning in the x and y directions can be in multiple of the pixel size, by shifting the original lenslet array 900 (FIG. 9*a*) in the x direction by multiples of the pixel size, to arrive at lenslet array 802 (FIG. 9*c*), or in the y direction to arrive at lenslet array 904 (FIG. 9*b*). As can be seen from FIG. 9, in this scanning technique, the pattern of the lenslet remains the same during the scanning. However, it will be appreciated that the pattern of the lenslet may additionally or alternatively be rotated in the x-y plane for digital rotational scanning, which is particularly suitable for the layout in polar coordinate It has further been recognised that if the pattern of the lenslet is changed during the scanning, the shift step in the scanning can be set to sub-pixel scale in the example embodiment. This technique will now be described with reference to FIGS. 10*a* and *b*. In FIG. 10*a*, the SLM pixels e.g. 1000 are controlled such that rather than changing the setting of each pixel 1000 to the setting of its neighbouring pixel during scanning, the setting of each pixel 1000 is changed independently. In other words, in FIG. 10*b*, the corresponding pixel 1000*b* has not been set to the value of its neighbour pixel 1002 (FIG. 10*a*), but to a setting calculated such that a centre point 1004 of the lenslet 1006 has been moved by a sub-pixel distance 1008 compared with the original centre point 1010 (FIG. 10*a*). It will be appreciated that the sub-pixel scale scanning can be achieved in the x-, y-, or both directions in different embodiments.

In the example embodiment, either the entire area of the incident wavefront may be scanned, or alternatively or additionally selected areas of the wavefront may be scanned. The improved lateral resolution of the example embodiment compared to existing techniques can provide measurement of the detailed topography of the incident wavefront.

Figure 11:
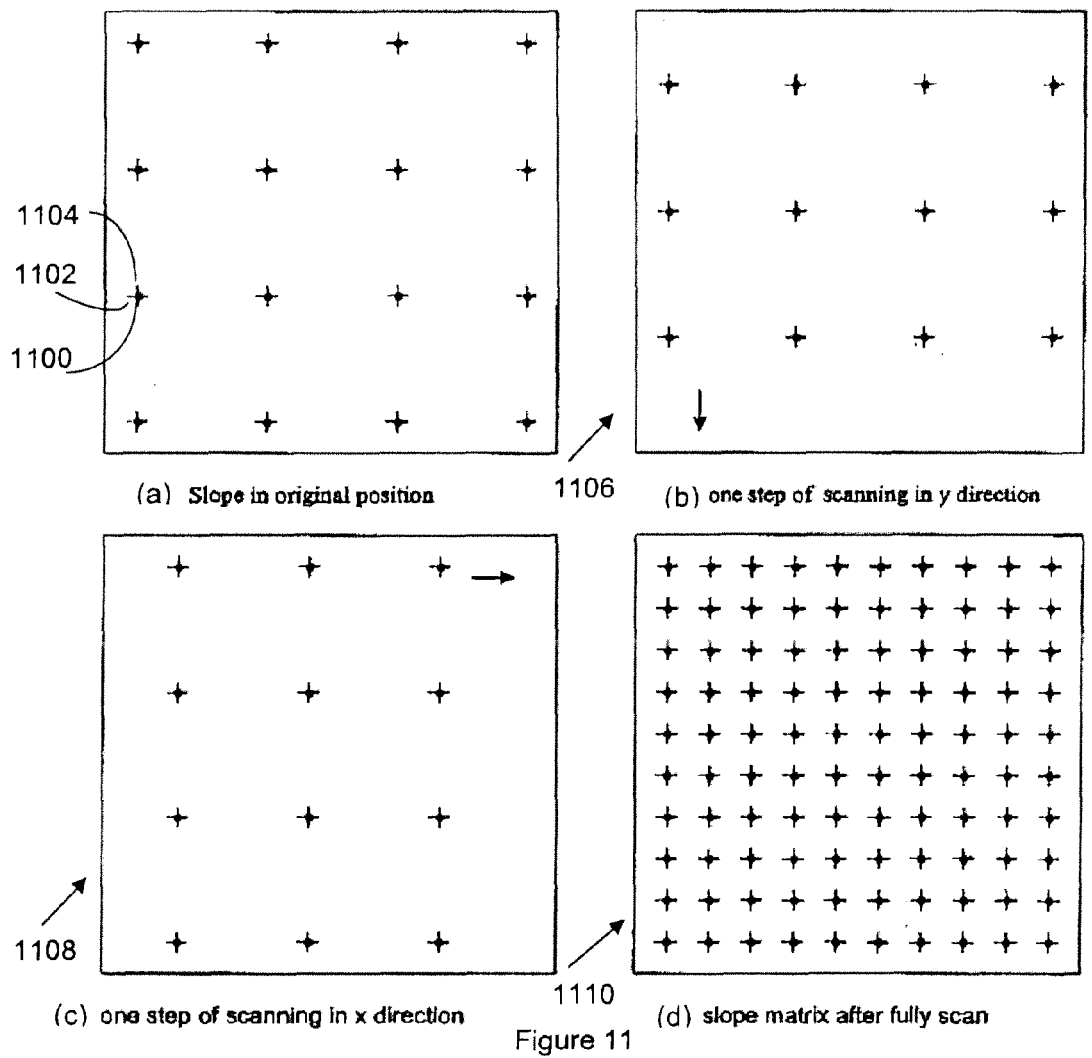
FIGS. 11a to d are schematic drawings illustrating slope matrices measured and reconfigured during digital scanning utilising the SHWS of FIG. 3.

The reconstruction of the wavefront in digital scanning the SHWS of the example embodiment is similar to that of conventional SHWS. For example, the Southwell algorithm can be used for the reconstruction in a Cartesian coordinate, as shown in FIG. 11. In FIG. 11, the dots 1100 (FIG. 11*a*) represent the centre point of each lenslet, whereas the bars 1102, 1104 (FIG. 11*a*) represent the slopes in the x and y directions respectively. FIGS. 11*b* and *c* show the slope matrices 1106, 1108 after one step scanning in y and x directions respectively, whereas FIG. 10*d* shows the slope matrix 1110 after a full scan in an example embodiment. After the full scan, the size of the slopes matrix 1110 is much larger than the original slopes matrix 1112 (FIG. 11*a*), which provides an improved lateral resolution after scanning. The reconstruction will use the data of slope matrix 1110 (FIG. 11*d*) after the full scan, thus providing the improved lateral resolution. In the example embodiment, to reconstruct the wavefront, the slope of the wavefront in each sub-aperture in the x- and y-directions respectively can be calculated using the following equations:

$$\frac{d\phi(x, y)}{dx} = \frac{\Delta x}{f} \qquad (1)$$

$$\frac{d\phi(x, y)}{dy} = \frac{\Delta y}{f} \qquad (2)$$

where $$\frac{d\phi(x, y)}{dx}$$

is the slope in the x-direction, $$\frac{d\phi(x, y)}{dy}$$

is the slope in the y-direction, $\Delta x$ is the shift of the centroid in the x-direction, $\Delta y$ is the shift of the centroid in y-direction, and f is the focal length.

The range of $\Delta x$ and $\Delta y$ is mainly limited by the pitch of the lenslet array, whereas the range of f is mainly limited by the lenslet diffraction efficiency, which is in turn related to pixel size, pixel phase range, lens size and other lenslet parameters.

In HWS, f is the distance between the image detector and hole array.

The measurement range, accuracy, and lateral resolution of the SHWS of the example embodiment are determined by the parameters of the lenslet array.

These parameters include focal length, lenslet size, sensor size, and pitch between two adjacent lenslet. Typically, the pitch may be equal to the lenslet size. All of those before mentioned parameters can be set by programming of the lenslet. For example, for measuring of wavefronts of various different scales, the parameters setting can be changed using the same SLM. In contrast, in conventional SHWS, a change to a different physical lenslet array must be made. If a larger measurement range is desired, the lens aperture can be increased and the focal lengths may be descreased in the SHWS of the example embodiment. On the other hand, if a high measurement resolution is desired, the focal length can be increased. Furthermore, if a high lateral resolution is desired, the lenslet aperture can be decreased. It will be appreciated by the person skilled in the art that selected settings can be chosen to balance between the various desired characteristics.

Figure 12:
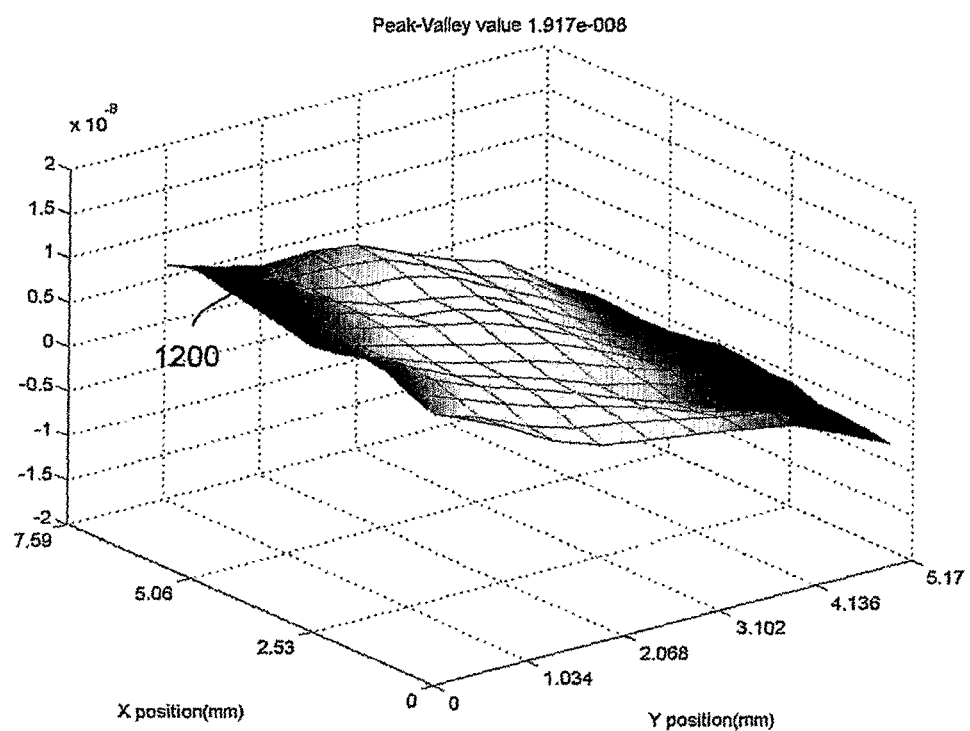
FIGS. 12a to d are graphs showing the reconstructed wavefront corresponding to x scanning only, y scanning only, x plus y scanning respectively.
Figure 12:
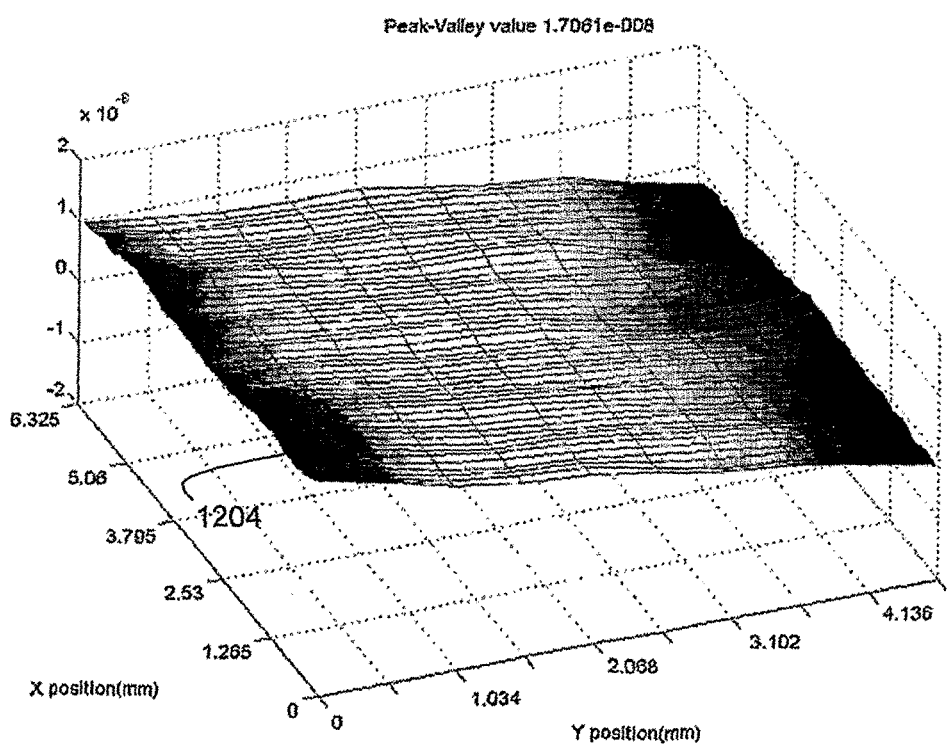
Figure 12:
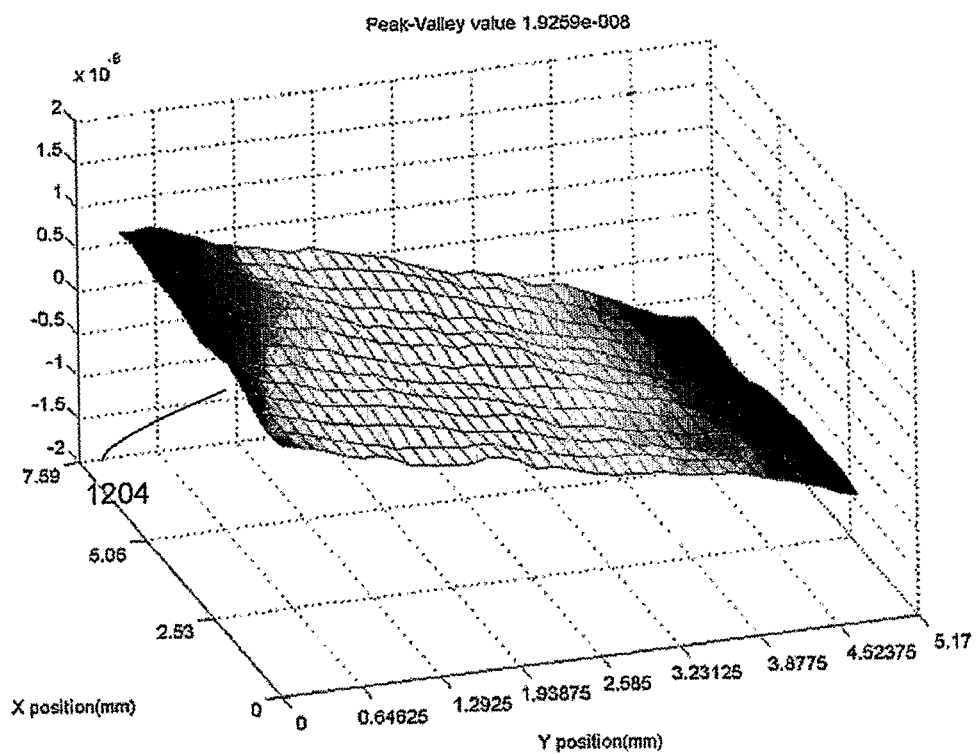
Figure 12:
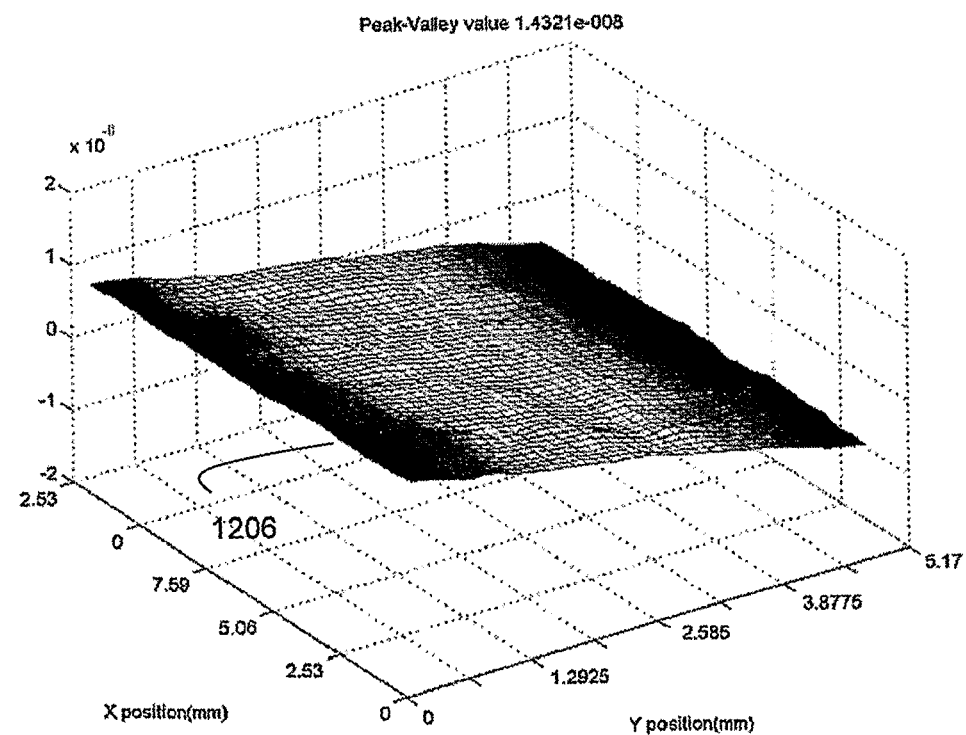

FIG. 12 shows the reconstructed wavefront measurements corresponding to the slope matrices in FIG. 12. More particular, FIG. 12a shows the wavefront measurement 1200 without scanning, FIG. 12b shows the wavefront measurement 1202 after full scanning in the x direction, FIG. 12c shows the wavefront measurement 1204 after full scanning in the y direction, and FIG. 12d shows the wavefront measurement 1206 after full scanning in both the x and y directions.

It will be appreciated that the digital scanning SHWS of the example embodiment can be equally applied to modal reconstruction, utilising for example the Zernike polynomial for polar coordinats.

Returning now to FIG. 3, another application of the example embodiment relates to digital lenslet scanning. In this scanning technique, the lateral position of each lenslet defined by the SLM 302 does not change during scanning. However, each lenslet can be switched on or off through suitable programming executed by a controller 306 coupled to the SLM 302. When a lenslet is switched off, that lenslet will block the incident portion of the wavefront 310.

It will be appreciated by a person skilled in the art that this technique can increase the dynamic range of the measurement, similar to expanding the dynamic range of conventional SHWS by using a separate SLM array positioned in front of a physical lenslet array as has previously been proposed. However, unlike that previous proposal, the digital lenslet scanning in the example embodiment does not utilise a physical separate lenslet together with a SLM. Rather, in the example embodiment the shutter array and the lenslet array are both created in the SLM, thus providing a reduction in optical components, together with full use of the flexibility of the SLM for creation of both different shutter and lenslet arrays, for example of varying size and pitch according to different applications.

Figure 13:
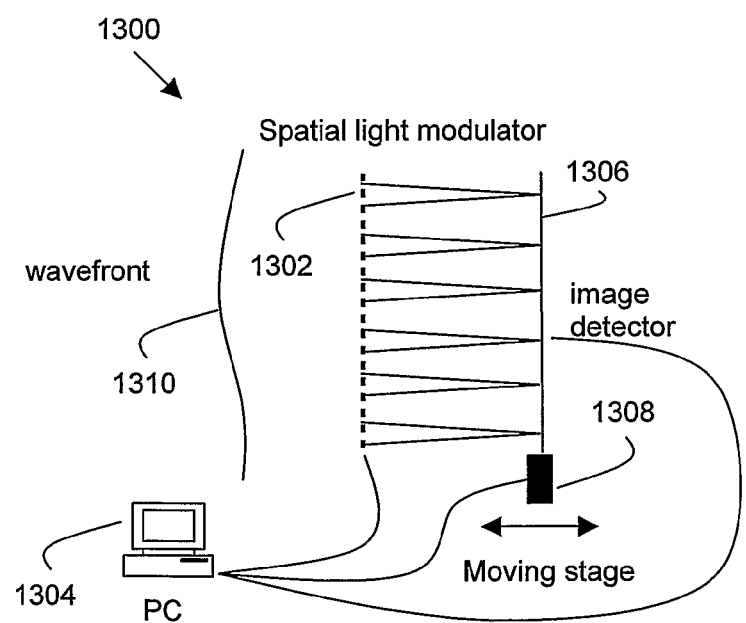
FIG. 13 is a schematic drawing of a modified SHWS in accordance with an example embodiment.

A modification of the SHWS 300 of FIG. 3 according to another embodiment is shown in FIG. 13. The SHWS 1300 comprises a SLM 1302 coupled to a controller 1304 in the form of a personal computer (PC), in this example embodiment. The SHWS 1300 further comprises a image detector in the form of a CCD 1306 mounted on a moving stage 1308. Both the CCD 1306 and the moving stage 1308 respectively are coupled to the controller 1304. The moving stage 1308 can be used to change the position of the detector 1306 to a desired focal plane during adaptive SHWS measurements.

Figure 14:
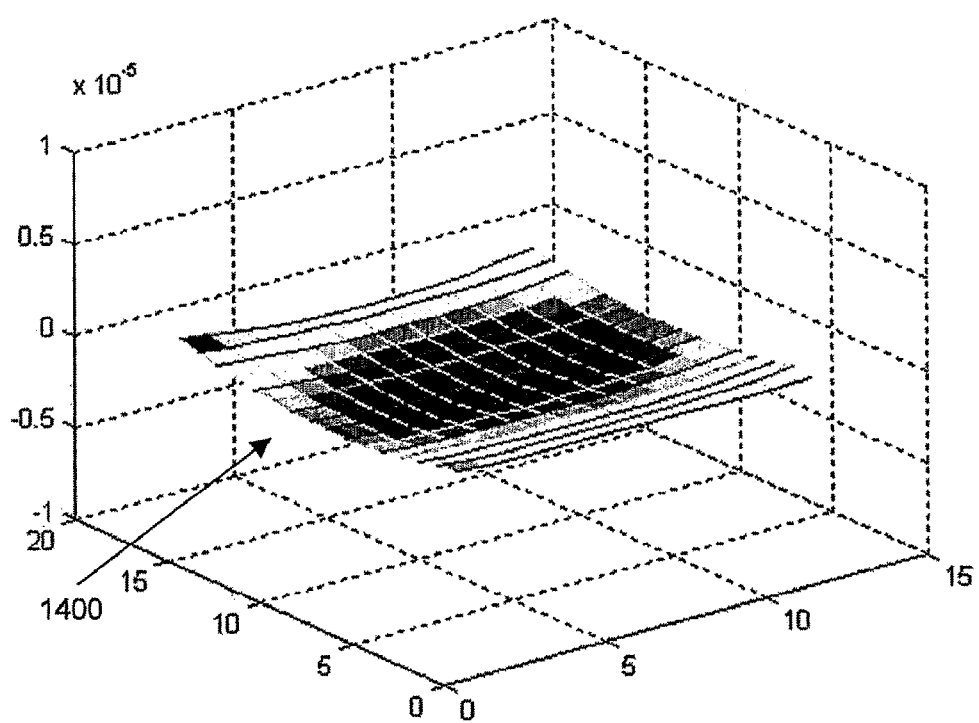
FIG. 14 shows a coarse measurement graph obtained utilising the SHWS of FIG. 13.

For example, at the beginning of a measurement of a wavefront 1310, the scale of the wavefront 1310 may not be known. Therefore, a larger measurement range can be pre-set for a coarse measurement, i.e. with a small focal length set in the lenslet array 1302, and the detector 1306 moved to the corresponding focal plane utilising the moving stage 1308. FIG. 14 shows an example coarse measurement 1400 of a wavefront under test.

Figure 15:
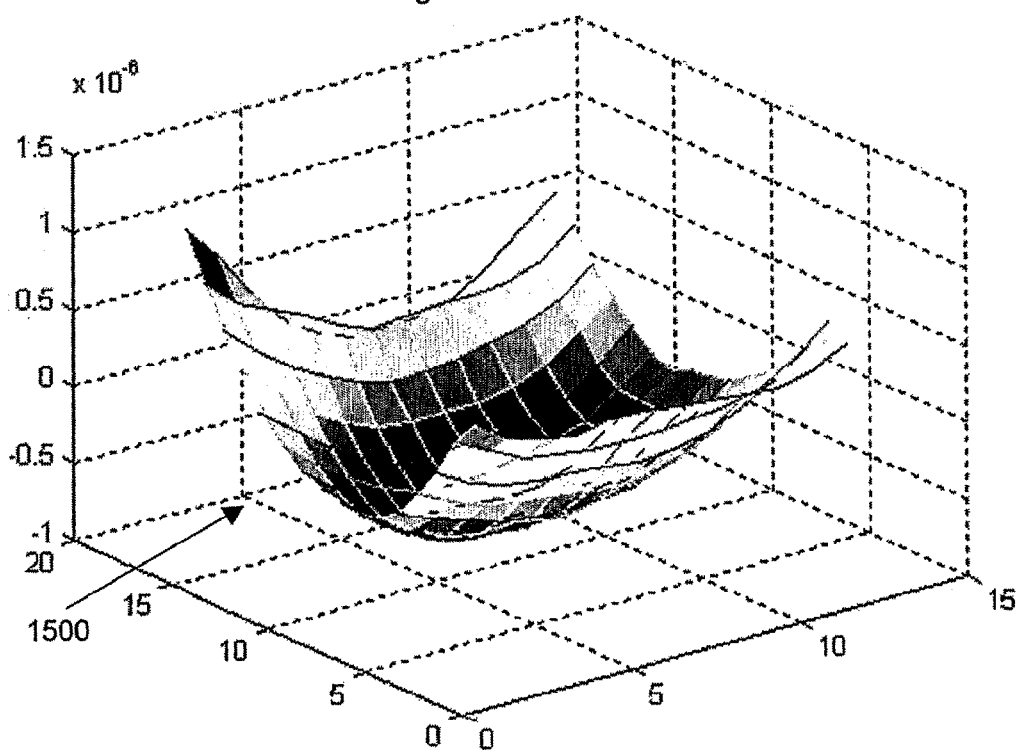
FIG. 15 shows a fine measurement graph obtained utilising the SHWS of FIG. 13.

After the preliminary, coarse measurement, the scale of the wavefront under test is known, and the SLM 1302 can be re-set to an appropriate measurement range. For example, if the wavefront under test is of a small scale, the setting of the SLM 1302 can be changed to a setting with a small measurement range and a higher resolution, for a fine measurement 1500 as shown in FIG. 15. It will be appreciated that the measurement range and resolution may be balanced automatically utilising the controller 1304, for providing an optimised resolution with a sufficient measurement range suitable for the wavefront under test.

Such adaptive SHWS in the example embodiment can be useful for a number of applications, for example for the dynamic measurement of a wavefront that changes over time, such as monitoring a turbulence of an airflow. For such applications, the SHWS 1300 can dynamically set the measurement range by tracing the wavefront scale.

Figure 16:
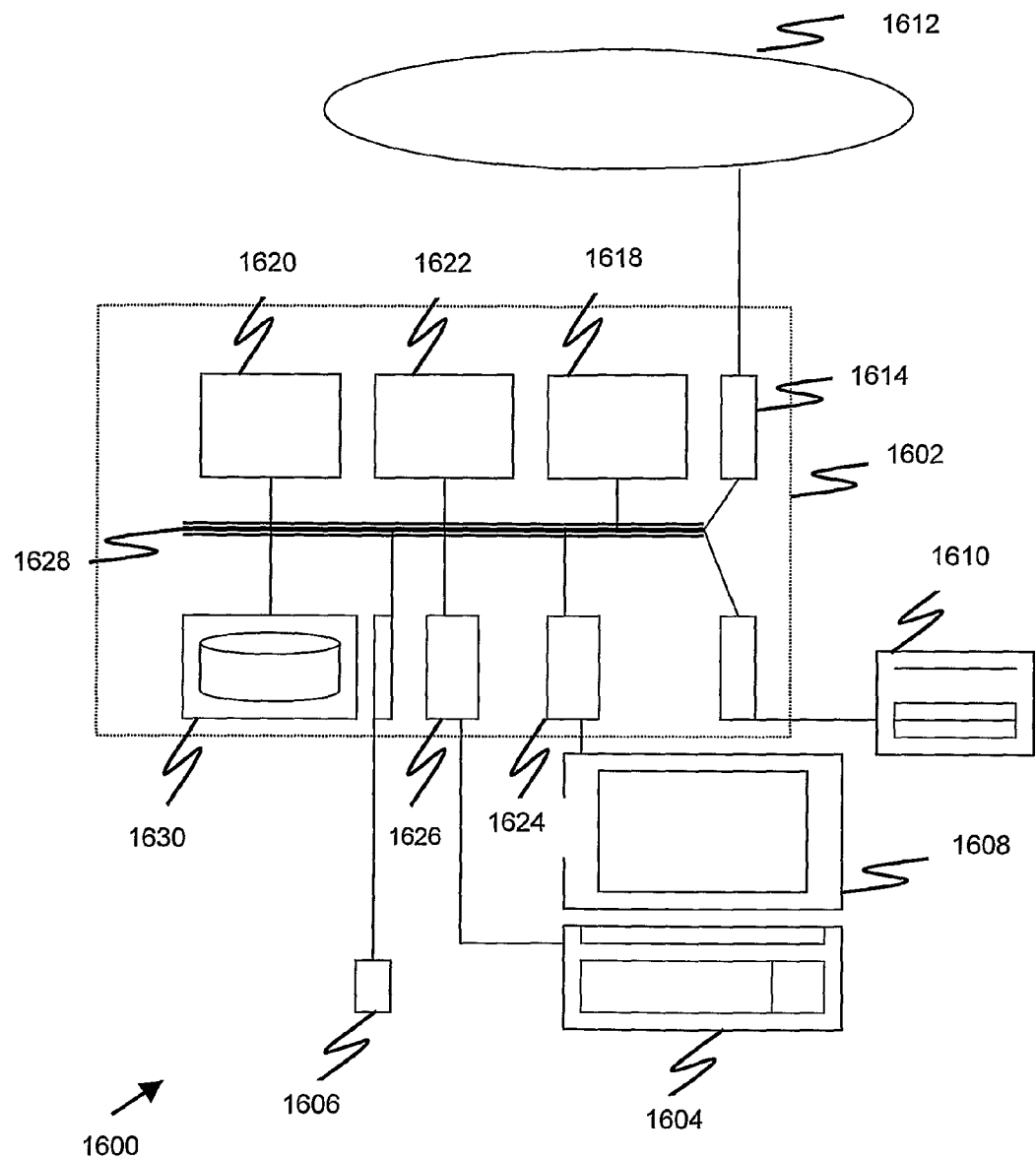
FIG. 16 is a schematic drawing of a computer system for implementing a controller for use in the SHWS of FIG. 3 or 13.

The controllers 306 (FIG. 3) and 1304 (FIG. 13) of the example embodiments may be implemented on a computer system 1600, schematically shown in FIG. 16. It may be implemented as software, such as a computer program being executed within the computer system 1600, and instructing the computer system 1600 to conduct the control of the SLM.

The computer system 1600 comprises a computer module 1602, input modules such as a keyboard 1604 and mouse 1606 and a plurality of output devices such as a display 1608, and printer 1610.

The computer module 1602 is connected to a computer network 1612 via a suitable transceiver device 1614, to enable access to e.g. the Internet or other network systems such as Local Area Network (LAN) or Wide Area Network (WAN).

The computer module 1602 in the example includes a processor 1618, a Random Access Memory (RAM) 1620 and a Read Only Memory (ROM) 1622. The computer module 1602 also includes a number of Input/Output (I/O) interfaces, for example I/O interface 1624 to the display 1608, and I/O interface 1626 to the keyboard 1604.

The components of the computer module 1602 typically communicate via an interconnected bus 1628 and in a manner known to the person skilled in the relevant art.

The application program is typically supplied to the user of the computer system 1600 encoded on a data storage medium such as a CD-ROM or floppy disk and read utilising a corresponding data storage medium drive of a data storage device 1630. The application program is read and controlled in its execution by the processor 1618. Intermediate storage of program data maybe accomplished using RAM 1620.

The example embodiment described can provide an optical wavefront sensor and optical wavefront sensing method which can provide improved lateral resolution compared to existing techniques. This can allow the detailed measurement of a wavefront topography. The entire incident wavefront, or selected portions thereof may be scanned. Furthermore, no physical lateral movement of components of the sensor are required during the digital scanning mode.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, a micro-mirror array may be used in different embodiments to form the lenslet array of the light manipulation device. In such embodiments, the wavefront sensing occurs in reflective mode. Such embodiments may therefore be useful for particular applications, such as wavefront measurement of ultra-violet (UV) waves or beams. While physical movement at a micro-level is involved in the reflective condenser setting using a micro-mirror array, the micro-mirror array itself remains at a constant lateral position. Such embodiments, which may be referred to as providing scanning in a quasi-digital mode, can still provide advantages over existing SHWS's. The micro-mirror variant can have all the functionalities of the SLM. Similarly, a reflective liquid crystal modulator array can also be used to form the reflective condenser array.

The invention claimed is:

1. An optical wavefront sensor comprising:
a light manipulation device;
a detector for detecting light signals having been subjected to the light manipulation device; and
a controller coupled to the manipulation device, the controller controlling the manipulation device to function as a lenslet array, each lenslet of the array focussing an incident portion of a wavefront onto the detector;
wherein the controller controls the manipulation device such that the lenslet array is moved relative to the wavefront for lateral scanning of the wavefront and the lenslet array is varied while being moved such that the scanning is at a lateral sub-pixel unit level of the manipulation device.

2. The sensor as claimed in claim 1, wherein the detector is moveable with respect to the manipulation device for adaptive wavefront measurements.

3. The sensor as claimed in claims 1, wherein the controller controls the manipulation device such that the lenslet array is moved relative to the wavefront for lateral scanning of the wavefront while the manipulation device remains at a constant lateral position.

4. The sensor as claimed in claim 1, wherein the controller controls the manipulation device such that the lenslet array is rotated in a lateral plane of the light manipulation device.

5. The sensor as claimed in claim 1, wherein the controller controls the manipulation device such that the entire incident wavefront or only a part thereof are scanned.

6. The sensor as claimed in claim 1, wherein the controller further controls the manipulation device to function as a switch to control an on or off state of lenslet array, for expanding a dynamic range of the sensor.

7. The sensor as claimed in claim 1, wherein the controller controls the manipulation device to function as a Cartesian coordinate lenslet array.

8. The sensor as claimed in claim 1, wherein the controller controls the manipulation device to function as a polar coordinate lenslet array.

9. The sensor as claimed in claim 1, wherein the detector comprises a CCD detector, or a CMOS detector, or a PSD (position sensing device).

10. The sensor as claimed in claim 1, further comprising a processor coupled to the detector for reconstructing the wavefront from light signals detected by the detector.

11. The sensor as claimed in claim 1, further comprising a moving stage coupled to the controller for moving the detector relative to the manipulation device.

12. The sensor as claimed in claim 1, wherein the manipulation device comprises a spatial light modulator.

13. The sensor as claimed in claim 1, wherein the manipulation device comprises a micro-mirror array.

14. The sensor as claimed in claim 1, wherein the lenslets of the array comprise circular, elliptic, rectangular, triangular, hexagonal, or octagonal apertures.

15. The sensor as claimed in claim 10, wherein the processor reconstructs the wavefront from a slope matrix detected by the detector.

16. The sensor as claimed in claim 11, wherein the controller controls settings of the manipulation device and the moving stage for the adaptive measurements.

17. The sensor as claimed in claim 16, wherein the controller is further coupled to the detector, and automatically controls the settings of the manipulation device and the moving stage for the adaptive measurements based on measurement signals detected at the detector.

18. A method of optical wavefront sensing comprising controlling a light manipulation device to function as a lenslet array, each lenslet of the array focussing an incident portion of a wavefront onto a detector;
controlling the manipulation device such that the lenslet array is moved relative to the wavefront for lateral scanning of the wavefront; and
varying the lenslet array while the lenslet array is being moved such that the scanning is at a lateral sub-pixel unit level of the manipulation device.

19. The method as claimed in claim 18, further comprising controlling settings of the manipulation device and a distance between the detector and the manipulation device for adaptive wavefront measurements.

20. The method as claimed in claim 19, comprising automatically controlling the settings and the distance for the adaptive measurements based on measurement signals detected at the detector.

* * * * *